United States Patent
Varfolomeev et al.

(10) Patent No.: US 10,719,734 B2
(45) Date of Patent: Jul. 21, 2020

(54) METHOD FOR EVALUATING STRUCTURAL CHANGES OF A SAMPLE RESULTING FROM A TREATMENT OF THE SAMPLE

(71) Applicant: SCHLUMBERGER TECHNOLOY CORPORATION, Sugar Land, TX (US)

(72) Inventors: Igor Andreevich Varfolomeev, Moscow (RU); Alexander Nikolaevich Nadeev, Spring, TX (US); Dmitry Anatolievich Koroteev, Moscow (RU); Ivan Victorovich Yakimchuk, Moscow (RU); Andrey Vladimirovich Kazak, Moscow (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/329,021

(22) PCT Filed: Jul. 25, 2014

(86) PCT No.: PCT/RU2014/000565
§ 371 (c)(1),
(2) Date: Jan. 25, 2017

(87) PCT Pub. No.: WO2016/013955
PCT Pub. Date: Jan. 28, 2016

(65) Prior Publication Data
US 2017/0220899 A1 Aug. 3, 2017

(51) Int. Cl.
*G06K 9/62* (2006.01)
*G06K 9/78* (2006.01)

(52) U.S. Cl.
CPC .......... *G06K 9/6215* (2013.01); *G06K 9/6212* (2013.01); *G06K 9/78* (2013.01); *G06K 2209/19* (2013.01)

(58) Field of Classification Search
CPC .. G06K 9/0014; G06K 9/6215; G06K 9/6212; G06K 9/78; G06K 2209/19
(Continued)

(56) References Cited

U.S. PATENT DOCUMENTS 2,840,717 A 6/1958 De et al.
4,562,726 A 1/1986 Barnaby
(Continued)

FOREIGN PATENT DOCUMENTS

RU 2184347 C2 6/2002
SU 1245875 A 7/1986
UA 50066 A 10/2002

OTHER PUBLICATIONS

Feldkamp, L. A. et al., "Practical cone-beam algorithm", Journal of the Optical Society of America A, 1984, 1(6), pp. 612-619.
(Continued)

*Primary Examiner* — Ali Bayat (57) ABSTRACT

Evaluating structural changes in a sample resulting from a treatment of the sample. At least one sample of the material is scanned before and after the treatment and a first and a second image of the sample are obtained. The first and the second images are registered in a full spatial resolution using at least one region of the first image and at least one region of the second image, the regions corresponding to the same part of the sample. The registered images are analyzed and the changes in each sample caused by the performed treatment are evaluated.

19 Claims, 10 Drawing Sheets

(58) Field of Classification Search
USPC .......................................................... 382/217
See application file for complete search history.

(56) References Cited

U.S. PATENT DOCUMENTS

| | | | |
|---|---|---|---|
| 5,469,488 A | 11/1995 | Ono | |
| 2007/0269085 A1* | 11/2007 | Oshiro | G02B 21/365 382/128 |
| 2010/0219506 A1* | 9/2010 | Gupta | H01L 21/02532 257/618 |
| 2011/0181701 A1* | 7/2011 | Varslot | G06T 7/30 348/46 |
| 2013/0135529 A1* | 5/2013 | Jalali | G02B 21/002 348/571 |
| 2015/0192461 A1* | 7/2015 | Chen | G02B 21/0032 356/366 |

OTHER PUBLICATIONS

Morita, N. et al., "Rock-Property Changes During Reservoir Compaction", SPE-13099, SPE Formation Evaluation, 1992, 7(3), pp. 197-205.

Amott, E., "Observations Relating to the Wettability of Porous Media", Petroleum Transactions AIME, 1959, 216, pp. 156-162.

Tiab, D. et al., "Petrophysics: Theory and Practice of Measuring Reservoir Rock and Fluid Transport Properties", Gulf Professional Publishing, 2nd Edition, 2004, pp. 371-373.

Zitova, B. et al., "Image registration methods: A survey", Image and Vision Computing, 2003, 21, pp. 977-1000.

Horn, B. K. P. "Closed-form Solution of absolute orientation using unit quaternions", Journal of the Optical Society of America A., 1987, 4, pp. 629-642.

Beucher, S. et al., "Use of Watersheds in Contour Detection", International Workshop on Image Processing, in Real-time Edge and Motion Detection, Renners France, 1979.

* cited by examiner

METHOD FOR EVALUATING STRUCTURAL CHANGES OF A SAMPLE RESULTING FROM A TREATMENT OF THE SAMPLE

CROSS-REFERENCE TO RELATED APPLICATION

This application is a U. S. National Stage Application under 35 U.S.C. § 371 and claims priority to Patent Cooperation Treaty Application Number PCT/RU2014/000565 filed Jul. 25, 2014, which is incorporated herein by reference in its entirety.

TECHNICAL FIELD

The invention relates to methods for studying samples of materials using their three-dimensional digital models, in particular, to investigation of changes caused by a treatment of a sample.

BACKGROUND

Study of samples of a material, e.g. rock, may require observation of structural changes which occur under various types of treatment of a sample. Typical treatments include: multiphase filtering of gas, liquid and solids through a sample, chemical treatment, mechanical treatment (deformation), heating, cooling, diffusion, etc. Generally, a treatment modifies either a structure of the sample or a distribution of substances within pores of the sample.

Transportation or storage of a sample is also an example of treatment, since the sample may undergo changes.

Usually, changes occurring in samples are defined using values of changes in various bulk properties (physical dimensions, weight, density, porosity, etc.). A variety of methods for determining these properties are known. For example, porosity can be measured by measuring pressure versus gas flow rate in the sample saturation process through weighing the liquid-saturated sample or petrographic analysis of sections (U.S. Pat. Nos. 4,562,726, 2,840,717). It is apparent that to evaluate changes in the sample these methods should be applied twice—before and after sample treatment.

Variation in wettability of a sample due to changes in physical properties of pore surface can be measured by the Amott method (D. Tiab and E. C. Donaldson, "Petrophysics: Theory and Practice of Measuring Reservoir Rock and Fluid Transport Properties", Gulf Professional Publishing, $2^{nd}$ Edition, 371-373 (2004)). The method substantially relies on the capillary displacement of water from a completely water-saturated sample by a liquid hydrocarbon mixture (kerosene), followed by displacement of the hydrocarbon mixture from the sample by water. The main disadvantage of this method is its low sensitivity, near neutral values of wettability and a high measurement error in the case of small samples, where the results of measurements of bulk properties become comparable with the measurement error of the methods.

Furthermore, the aforementioned and similar methods have other disadvantages:
Lack of spatial resolution
Inability to determine the immediate cause of changes that occurred
Low sensitivity to small changes in the sample—the measurement error may be greater than the required difference between the measured values.
Damage of the sample during measurements, which may hinder detection of changes due to the effect under investigation.

SUMMARY OF THE INVENTION

The present method for evaluating structural changes in a sample resulting from a treatment of the sample, provides:
non-destructive measurements
availability of spatial resolution
ability to determine an immediate cause of change in the structure and properties of the sample
high sensitivity to small changes in the sample (i.e. even only a small portion of the sample was affected by significant changes).

The present method includes: scanning at least one sample of a material and obtaining a first image of each sample. A treatment is performed on each sample; each sample is scanned after the treatment and a second image of each sample is obtained.

For each sample, the first and the second images are registered in a full resolution, using at least one region of the first image and one fragment of the second image, which correspond to the same part of the sample.

Then, the registered images are analyzed, and changes in each sample, resulting from the treatment of the sample, are evaluated.

The first and the second images of each sample can be previously spatially registered in a reduced resolution.

Variety of possible treatments of a sample is quite broad and may include, for example, thermal, chemical or mechanical treatments. Transportation or storage of a sample may also be an effect. For example, a sample may be affected by the environment, or some internal processes may take place in a sample, which cause changes therein.

Scanning of the sample can be performed, for example, by X-ray computer tomography, neutron/positron tomography, positron emission tomography, nuclear magnetic resonance imaging, electron microscopy, laser fluorescence microscopy, optical microscopy, confocal microscopy, and Raman microscopy.

Scanning before and after the treatment may be performed by different methods.

The obtained images can be one-dimensional, two-dimensional or three-dimensional. Furthermore, each image point (pixel, voxel) may be either a single number or a set of numbers.

At least one of the two obtained images of the sample may be pre-processed to remove distortions of a known character.

Pre-processing of the images may include, for example, scale correction of the image, geometric correction, correction of the color palette of the image.

In accordance with one embodiment, an initial approximation is specified for registering the obtained images.

An important part of the invention is the analysis of the registered images, which may include, for example, construction of two-dimensional histograms, depth analysis of damages, analysis of dependence of the number of damages on the grain size.

If necessary, a differential image may be constructed from the registered images.

Each sample can be subjected to different treatment (differing both in quantity and quality), followed by determining a treatment that caused a change of a specified type and value.

It is possible to study the evolution of changes in the sample structure caused by the same repeated treatment, as well as by a sequence of different treatments.

BRIEF DESCRIPTION OF DRAWINGS

The invention is illustrated by drawings.

DETAILED DESCRIPTION

The present method is implemented as follows. At least one sample of a material is subjected to a treatment. Examples of the treatment comprise: a multiphase filtering of fluid/gas through the sample, a chemical treatment, a mechanical treatment, heating, cooling, diffusion, etc. The treatment may also be a transportation or a storage of the sample.

The sample of the material is scanned before and after the treatment. Currently, there are many methods of producing three-dimensional images: confocal microscopy, ultrasound tomography, single-photon emission computer tomography, magnetic resonance imaging, positron emission tomography, X-ray tomography, neutron tomography and others. There are even a greater number of methods for producing two-dimensional images of a sample: scanning electron microscopy, optical microscopy, fluorescence microscopy (in particular, laser fluorescence microscopy, X-ray fluorescence analysis), acoustic microscopy and others. Apparently, any two-dimensional image may be considered as a special case of a three-dimensional image. Some types of investigation, such as probe microscopy, thermal conductivity profiling, generally produce profiles of a property, "one-dimensional images".

Thus, the obtained images may be one-dimensional, two-dimensional or three-dimensional. Furthermore, each image point (pixel, voxel) may be both a single number (for example in tomogram, X-ray attenuation coefficient at a given point of the sample) and a set of numbers. For example, X-ray microanalysis of a sample surface with an electron microscope can produce an image, in each point of which a discretized spectrum of X-ray excited by an electron beam and emitted from the sample surface is detected in an energy range.

It should be noted that scanning before and after the treatment may be, in principle, performed by different methods. For example, both X-ray and neutron topographies allow reconstruction of the three-dimensional internal structure of a rock sample using different physical quantities. In this case, hollow spaces in the sample before and after the treatment can be detected in both images, registration of which will enable analysis of changes which have occurred in the sample.

For the sake of simplicity, both one- and two-dimensional images will be hereinafter considered as a special case of three-dimensional images.

Hereinafter, a three-dimensional image means a three-dimensional array stored in a computer memory. This array can also be considered as discrete function $I:\Omega \to \zeta$, where $\Omega$ is the domain of determining the discrete functions, and $\zeta$ is the domain of values of function I. Domain $\Omega$ of determining discrete function I is the space of image coordinates. For example, point $A=[x, y, z]$, where x, y, z are spatial coordinates of a point (voxel) in image I (by definition) belongs to $\Omega$, which is usually denoted as $A \in \Omega$, where $I(A) \in \zeta$.

In some cases, the produced image may contain some previously known distortions. For example, two images may have slightly different color spaces, or, for example, two reconstructed three-dimensional X-ray images may have somewhat different physical size of voxel. In many cases, images may have a previously known type of geometric distortion. If a priori information about distortions is available, it is sometimes possible to accomplish pre-correction of the image to facilitate further a registration process. On the other hand, this step is not necessary if the nature of distortions can be taken into account in the image registration procedure as such.

The above example, where two images have different voxel sized, has two options:

Correct the voxel size before the image registration procedure, and then accomplish registration without the need for scaling the image in the registration process;

Omit correction of the voxel size, allowing the registration algorithm to find the right scale (in this case, the user can restrict the area of searching to a correct scaling factor).

Next, the produced images are registered. The task of registering the images in the simplest case is as follows. There are two images, which show the same object positioned in different ways. It is required to find a spatial transformation for one image, at which the object depicted in it will coincide with the object (itself) shown in the other image.

One of the most common methods to simplify this task is the use of marker objects existing or artificially introduced in the sample, which can be easily detected in the registered images. Such markers may be, for example, specific shears, fractures, mechanical tags, contrast (to the scanning method used) particles. Generally, the test sample may be free of natural markers. Introduction of artificial markers may be undesirable in view of an additional effect destructing and/or modifying the sample structure, which has nothing to do with the main type of effect studied. Thus, this approach to simplify the task of image registration has a restricted field of application. The described invention is devoid of this shortcoming.

In this text we restrict ourselves mainly to similarity transformations. Similarity transformation is the transformation of Euclidean space, in which relation $|A'B'|=k|AB|$ is true for any two points A, B and their images A', B', where k is a positive number referred to as "similarity coefficient". This transformation allows moving, rotating, and scaling the object. It can be specified by the following set of parameters: x, y, z, $\varphi$, $\theta$, $\psi$, s. Here, parameters x, y, z are associated with displacement along respective spatial axes, and parameters φ, θ, ψ are associated with rotation about axes x, y, z, respectively; s is "scaling coefficient".

This approximation is quite sufficient in most cases encountered in practice.

Figure 1:
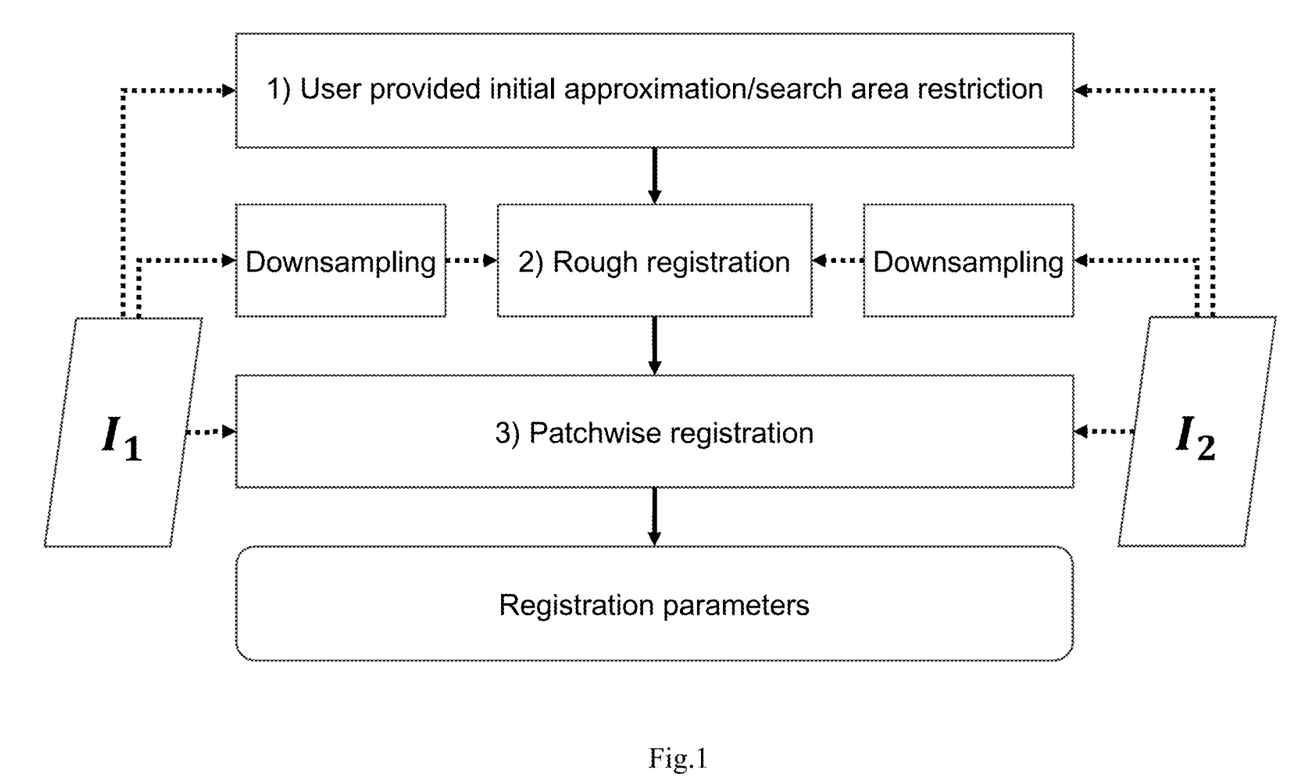
FIG. 1 is a flowchart of registration of images of a sample.

FIG. 1 shows a flowchart of the main steps of the process of registering images $I_1$ and $I_2$ in accordance with one embodiment. At preliminary step (1) an initial approximation can be specified to reduce the required number of computations. In step (2), if necessary, the computational algorithm accomplishes a reduced registration of the images in a low quality. In step (3), the algorithm accomplishes "fine tuning" of the transformation parameters based on regions of the images in full resolution, what is referred to as "patch-wise superposition". As a result, a full differential image can be created from the known transformation parameters, if necessary.

Further, these steps will be discussed in more detail.

Basic procedures of the described method (obtaining an image, accomplishing the registration algorithm, and often even exerting a treatment on the sample) are implemented using electronic computing systems. It may be a single system for all the procedures. However, different computers are generally used for each task. All these computer systems should comprise:

- a processor to execute necessary commands and computations;
- a memory to store temporary and permanent information (having a sufficient capacity to operate with created images);
- input and output devices to control and monitor the executed procedures; and
- means enabling transmission of information via a network or removable media.

In the simplest embodiment, the computer system may be a personal computer.

Current commercially available X-ray scanners can achieve a spatial resolution of up to 0.1 µm/voxel at 16-bit color resolution (coefficient of absorption of used X-rays), where a three-dimensional image of 4000×4000×4000 voxels in size is obtained as the result of reconstruction. High quality and high resolution of the image naturally leads to its large size. For example, with the characteristics described above an uncompressed image will occupy $4000^3 \times 2 = 128$ GB (here it is assumed that 1 GB=1000 MB). Images of this size cannot be currently processed in a reasonable time by "straight" algorithms on modern PCs.

Generally, the area-based image registration algorithm (Image registration methods: a survey. Barbara Zitova, Jan Flusser, Image and Vision Computing 21 (2003) 977-1000) comprises two key steps: preliminary rough registration of images in a low quality and registration of the images in a full quality.

In many cases, the first step is introduced in order to accelerate the computing process by reducing the required number of iterations that use the full quality image. However, even taking into account the optimization, the maximum achievable performance of the algorithm is not satisfactory, especially in a case where the total image size is greater than the available capacity of RAM of the computing station, which will lead to a great amount of reading/writing to slower media.

At the preliminary step of the present method, to minimize the computation time the user may himself choose a set of respective points on the images being registered. Thus, an initial approximation can be specified for registration parameters. Despite the fact that the initial approximation depends on the operator, the final registration result is substantially independent of the operator, as in the computation process the algorithm will converge to a sole correct transformation, regardless of the initial approximation.

The user can specify points using an available graphical interface by specifying points that are "similar" in his view on sections of images "before effect" and "after effect". That is, the user selects, in each image, "similar" sections having a common feature, then the user selects the feature on each of the images to create a pair of points $\{A_i, B_i\}$. The user may add any number of pairs of points. To estimate the initial approximation at least three pairs of points is required.

Parameters ($[x_m, y_m, z_m, \varphi_m, \theta_m, \psi_m, s_m]$) of similarity transformation $T_m$, corresponding to the selected pairs of points, can be assessed over three pairs of points, for example, by the Horn method (see e.g. Berthold K. P. Horn "Closed-form solution of absolute orientation using unit quaternions", Journal of the Optical Society of America A, Vol. 4, page 629, April 1987). If the image scale is known with a sufficient accuracy, it is sufficient to evaluate only parameters $[x_m, y_m, z_m, \varphi_m, \theta_m, \psi_m]$ by this method.

Furthermore, it is possible to assess the accuracy of the initial approximation in order to determine "hyperrectangular of the search area." The area of search for solution of a task commonly refers to a plurality of values of unknown variables of the task, in which the search will be made to solve the task. So, the task of registration of two three-dimensional images by similarity transformation is generally reduced to finding seven values of parameters (variables) $[x, y, z, \varphi, \theta, \psi, s]$ with respective search area: $[R, R, R, [180°;180°], [90°;90°], [180°;180°], s \neq 0]$, where R is a multitude of real numbers. Generally, in each particular case search for solution in such an infinite domain is not required. Often the area of search for required transformation can be represented as a hyperrectangular, whose sides are parallel to coordinate axes of the space of required variables. Diagonal of the hyperrectangular $[\sigma_x, \sigma_y, \sigma_z, \sigma_\varphi, \sigma_\theta, \sigma_\psi, \sigma_s]$ will be called "search area width", and the search area center coincides with the initial assessment $[x_m, y_m, z_m, \varphi_m, \theta_m, \psi_m, s_m]$ of transformation parameters.

The search area width can be estimated only through the distance between the points selected by the user in first image ($A_i$) and positions of images of corresponding points ($B_i$) predicted by transformation ($T_m$)

$$\sigma = \left( \frac{1}{n-1} * \sum_{i=1}^{n} |A_i - T_m(B_i)|^2 \right)^{0.5}$$

where |A| is the modulus of vector A (Euclidean distance from origin [0,0,0]). Accordingly, the search area width can be evaluated as follows:

$\sigma_x = \sigma$ $\sigma_y = \sigma$ $\sigma_z = \sigma$ $\sigma_\varphi = \sigma/S_x$ $\sigma_\theta = \sigma/S_y$ $\sigma_\psi = \sigma/S_z$ $\sigma_s = \sigma/\min(S_x, S_y, S_z)$ where $S_x$ is the largest dimension along axis x of the 1st and 2nd three-dimensional images.

In most cases, the user may indicate three pairs of points quite quickly. This, on one hand, saves the computer time, and on the other hand (which is even more important) makes the entire registration procedure much more reliable.

Figure 2:
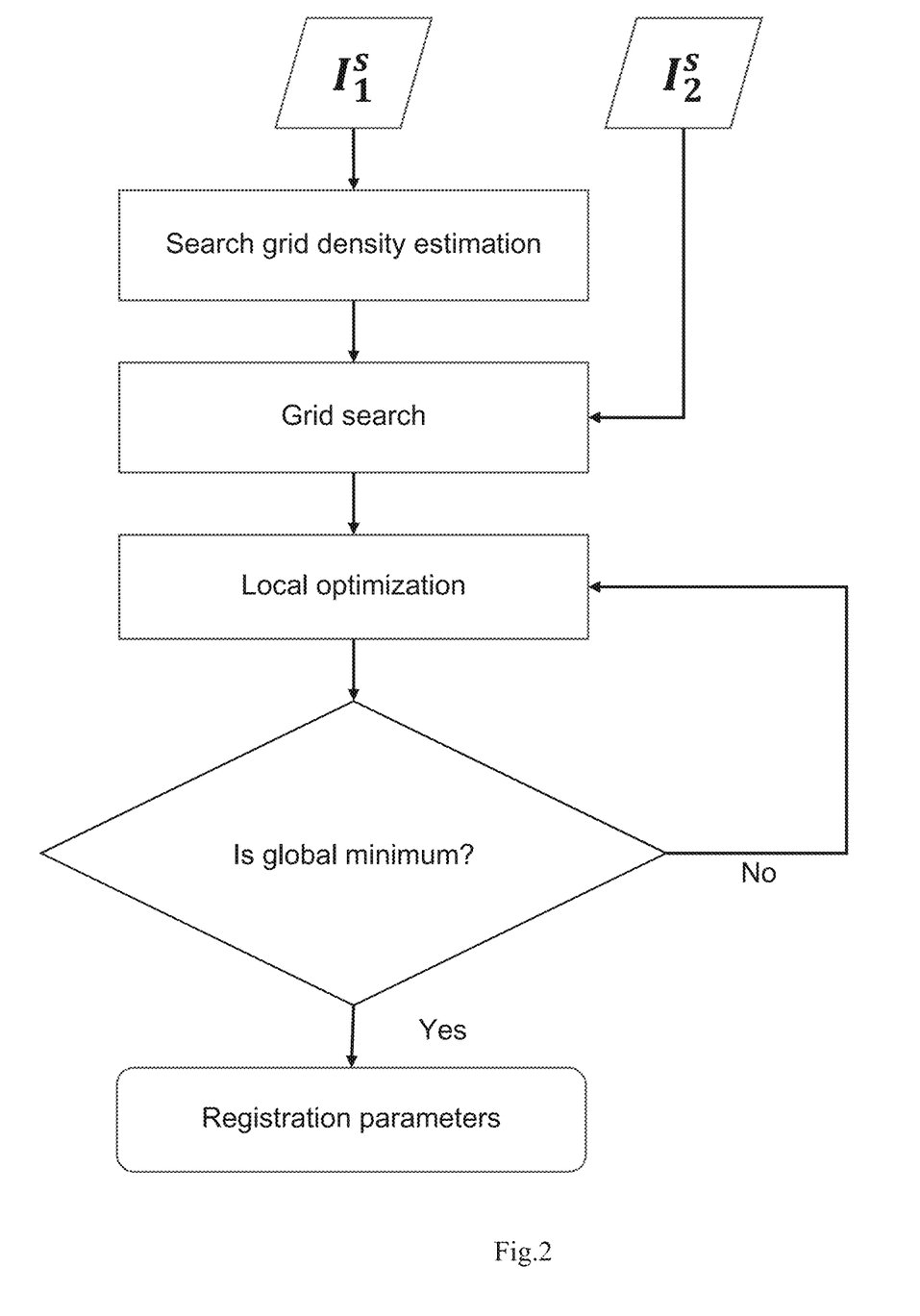
FIG. 2 is a flowchart of a reduced registration of sample images.

The next step of registering images, reduced (rough) registration step, comprises several parts, as schematically shown in FIG. 2. The main task of this step is to provide the registration with an accuracy sufficient for further "patchwise registration." This allows the use of lower resolution images (having a lower spatial resolution and/or a more roughly discretized color space). Use of lower resolution images increases the computation speed to a considerable extent.

The step of reduced registration of images begins with a preliminary grid search. Grid search is a well-known technique in many optimization tasks, which allows finding an approximate location of a global minimum, and a maximum or a value satisfying another criterion (without loss of generality, further considered as a minimum search task). The task under consideration provides minimization of image similarity functional $Q(T_i)$, which is a measure of similarity (lower value corresponds to a greater similarity) of the first image and the second image subjected to similarity transformation $T_i$ with parameters $[x_i, y_i, z_i, \varphi_i, \theta_i, \psi_i, s_i]$. In the simplest case of superposing two images having the same color space, obtained at the same device and storing some common structural features, it is sufficient to use the simplest L2-like functional:

$$Q(T) = \left( \frac{1}{n-1} * \sum_{B \in \Omega_2} |I_1(T(B)) - I_2(B)|^2 \right)^{0.5}$$

where: Q—the similarity functional;
n—the number of pairs of pixels in the compared images;
$I_1$—the first three-dimensional image;
$I_2$—the second three-dimensional image;
B—a point from multitude $\Omega_2$.
A=T(B)—a point from multitude $\Omega_1$, corresponding to point B, according to transformation T(B).

The simplest method of finding a function minimum is to compute directly its values in a finite set of points within the search area. It is convenient to form a set of such points (for example, if the search area is hyperrectangular) uniformly for each variable. The result is a grid of points, in which the search for solutions is carried out. Size of the grid spacing (spacing's for each variable), or the inverse of the spacing-grid density, significantly affects the correctness of the solution found. Sufficient grid density is the density at which the function behaves monotonically between the search grid nodes. On the other hand, an increase in the grid density leads to a rapid increase in the time required for computation. Selection of the optimal grid density remains one of the main difficulties related to the grid search.

The present method uses an algorithm that allows automatic assessment of the optimum grid density for each particular registration. Typically, for quick assessment of the highest possible grid spacing (MAX_ST) it is sufficient to analyze the dependence of the similarity functional on transformation parameters $[x, y, z, \varphi, \theta, \psi, s]$, taking as the second image (undergoing the transformation) a full copy of the first one. To this end, a number of points of dependence of the similarity functional on small values of transformation parameters $[x, y, z, \varphi, \theta, \psi, s]$ is computed.

For each of the seven transformation parameters a minimum meaningful grid spacing for this parameter, ST, and a maximum possible grid spacing for this parameter, MAX, are selected. For each value of this parameter from 0 to MAX with spacing ST the image is transformed according to the current value of the assessed parameter, and similarity functional Q between the original and transformed images is computed. From the computed dependence MAX_ST is determined, which is a value of the assessed parameter below which similarity functional Q decreases monotonically. The selected grid spacing's for each of the parameters provide monotony of similarity functional changes when the original first image is registered with the second image obtained after the effect.

A search for the optimal registration on the specified grid comprises computation of similarity functional in all grid nodes, that is, for each set of transformation parameters available in the grid, or in other words, for each parameter values with corresponding spacing MAX_ST for each parameter available in the hyperrectangular search area. The selected optimal set of transformation parameters is the one that corresponds to the minimum value of the similarity functional.

Then, the nearest local minimum of the similarity functional is searched for in the neighborhood of the solution found on the grid. In the procedure of local optimization substantially any known optimization algorithm can be used, or several different algorithms can be used with the best results provided by the algorithms then chosen. For example, a limited simplex search may be sufficiently fast and robust in this case.

Unfortunately, local search algorithms often lead to finding not global, but local minimum. To verify globality of the found minimum the described algorithm comprises an extra step. Upon termination of the local search procedure, another similar procedure is started, but this time, the starting point is a point spaced apart at a certain distance from the minimum found in the previous step. If the minimum found is global, the second search should converge to the same value (taking into account the disparity set by the user) as the first, otherwise the search procedure is started again. If the number of re-searching exceeds a predetermined threshold, the algorithm notifies the user of the registration error and offers checking and/or modifying the registration parameters. This procedure is based on the assumption that the monotony area of functional similarity in the case of a global minimum is greater than in the case of a false "local" minimum. This assumption is true in most cases of three-dimensional images encountered in practice.

After the reduced registration of the images it remains only to verify the solution, returning to full (original) spatial resolution, i.e. the size of pixel (voxel). However, if the total image size is large enough (as in the case of modern microtomograms), even one iteration of direct local registration of full-size images may take a long time. Direct selection of transformation parameters using full images is very inefficient in this case, since it requires either simultaneously finding the registered images in RAM, or repeatedly reading the image from the data storage device. Thus, the direct registration method loses its effectiveness with increasing image size. The algorithm described below allows registration of large three-dimensional images without the need to carry out a direct comparison of full images.

Figure 3:
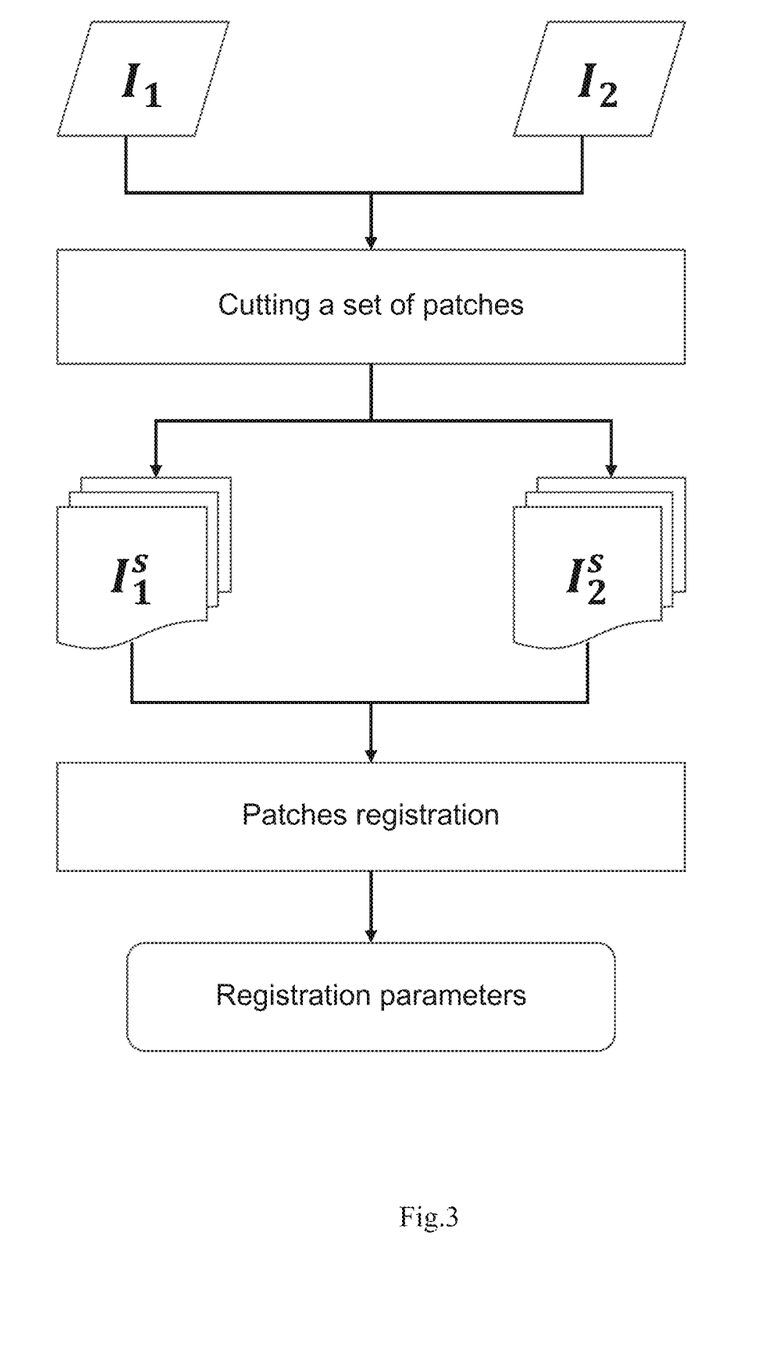
FIG. 3 is a flowchart of patchwise superposition of sample images.

FIG. 3 shows a flowchart of the final step of image registration, patchwise registration, where $I_1$ и $I_2$ are registered images; and $I_1^s$ и $I_2^s$ are regions cut out from respective registered images.

Total computational complexity will be much lower if the full transformation is computed independently from several independently registered regions of the original image, patches $I_1^s$ and $I_2^s$. The ability to register small pieces of full images appears as a result of the preliminary reduced registration, after which the patches selected by the same coordinates in both images will approximately correspond to the same part of the sample. Each pair of patches is registered completely, similarly to the reduced registration procedure.

The patches can be chosen either automatically or manually by the operator. Any restricted portion of the image can be used as a patch. Any number of "patches" can be used; in particular, they may completely cover the original image. Patches may also be spatially superimposed. Processes of superposing pairs of patches are completely independent, thereby enabling high parallelism of computations. It seems expedient to form a set of "patches", depending on the sample type and the effect, as well as the purpose of the study. The following describes some of the most typical cases.

If the sample is a solid body, the patchwork registration can be used to speed up the computation process. It is achieved due to the fact that it is sufficient to register only a few "patches". In particular, there can be used patches with the following centers (x, y, z):
1) $(min_x, c_y, c_z)$
2) $(max_x, c_y, c_z)$
3) $(c_x, min_y, c_z)$
4) $(c_x, max_y, c_z)$
5) $(c_x, c_y, min_z)$
6) $(c_x, c_y, max_z)$ where $min_{DIM}$ and $max_{DIM}$ correspond to boundaries of the sample along DIM axis. These values are selected automatically so that the patch corresponds to the boundary of the sample, rather than the empty space near it. DIM is one of spatial axes: x, y, or z, while $c_{DIM}=(min_{DIM}+max_{DIM})/2$ is the center of the sample along DIM axis.

Such selection of patches provides a high accuracy of registration owing to the distance between the patches, close to maximum possible. With this, the computational complexity remains relatively low.

After registration of all planned patches parameters of similar transformation can be accurately estimated for the entire sample by pairs of points, as described above, using vertices of patches as pairs of points.

If the algorithm produces an unacceptably large amount of error in the process of finding the spatial transformation parameters for the entire sample during the patchwork registration step in solid body approximation (i.e. without deformation) it may mean that the sample was deformed under the effect. If this option is allowed by the operator, the algorithm may automatically go to using a larger number of "patches" in order to assess and take into account the deformation of the sample.

Three-dimensional deformation field can be assessed by registered patches, for example, using displacement vectors that describe displacement of vertices of "patches" with respect to the global optimum transformation for registration of images (in solid body approximation). Patchwise registration of deformed samples can significantly improve the quality of a differential image, which in this case can be produced by "sewing" locally registered patches.

In some cases, one portion of a sample may be damaged much stronger than the other, and its use in the registration process is problematic. A large relative volume of the damaged portion may result in insufficient registration quality in the case of a direct search for optimal transformation over the entire image. In the described algorithm, the user can himself select the area to be used in the registration process. This can be done both in the rough and patchwork step independently. In this case, the differential image will be constructed for the full original image. This area can also be selected automatically as an inner part of the sample at a distance from its boundaries.

If desired, after the parameters of the transformation registering the images before and after treatment have been computed, it is possible to construct a differential image showing changes in the sample structure resulting from the treatment.

Generally, "differential image" is understood as a function of both registered images, that is:

$$I_d(B)=f(I_1(T(B)),I_2(B)).$$

A simple example of such a function is difference modulus $I_d(B)=|I_1(T(B))\ I_2(B)|$.

In the case of a solid body approximation, T(B) is the similarity transformation. In the case of a deformed sample, T(B) corresponds to the similarity transformation with subsequent deformation.

Figure 4:
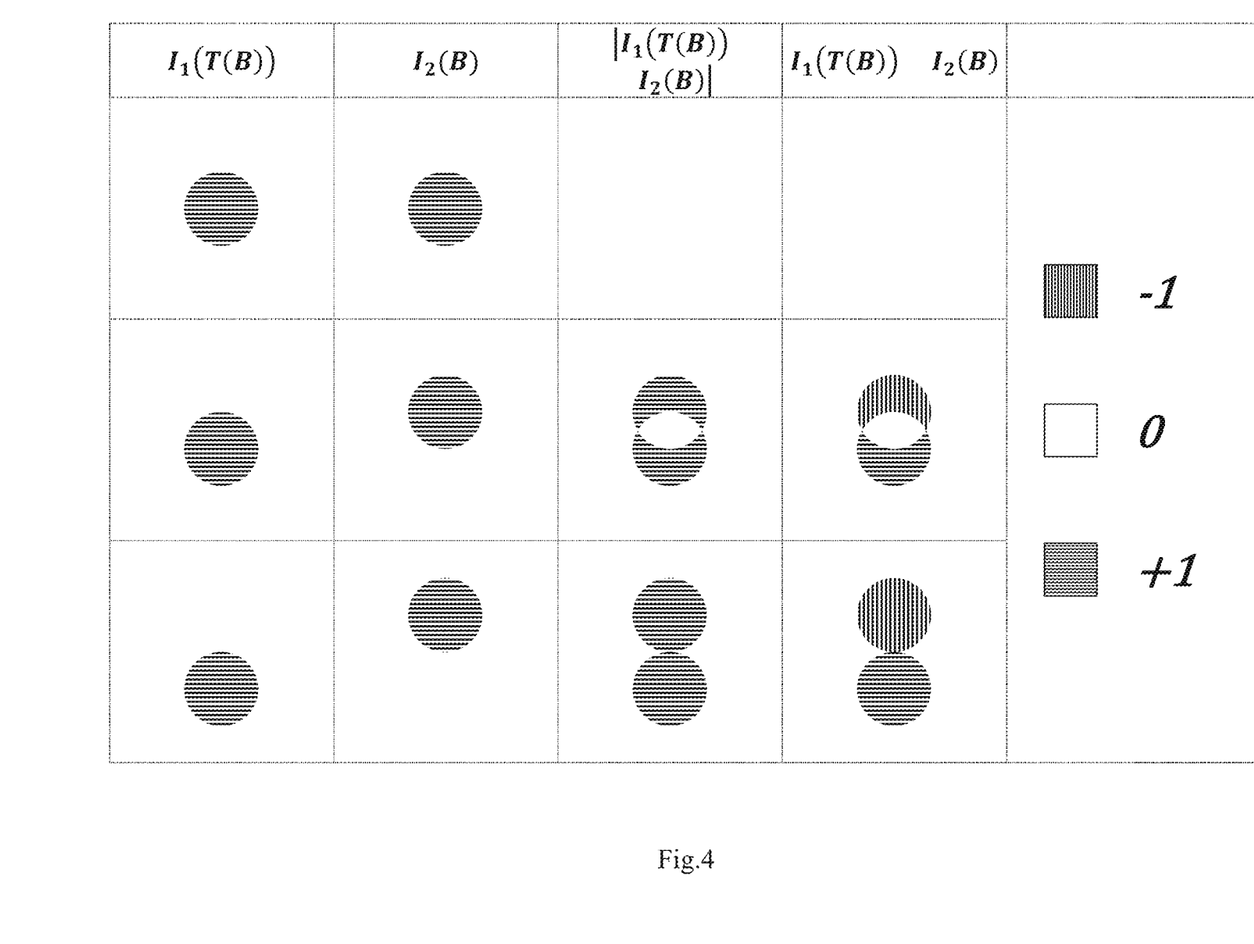
FIG. 4 shows examples of differential images.

FIG. 4 shows two simple examples of function $f$. In the case of a circle shifted at some distance, two polar regions appear on the differential image. In general, analysis of the differential image can give information about changes in the sample, including migration of particles in the pore space, appearance/clogging of pores and fractures of various scale, destruction of rock particles, and consolidation or loosening of the substance.

To evaluate the structural changes occurring in the sample as a result of the effect, analysis of the registered images is carried out.

In order to quantify and perform visual analysis of the number of changes in the sample structure, various statistical functions can be computed which include: dependence of the number of changes on the grain size.

For many types of rock the original three-dimensional image can be clustered. In the simplest case, this can be done using the algorithm based on the watershed method (Serge Beucher and Christian Lantuéjoul. Use of watersheds in contour detection. In International workshop on image processing: Real-time edge and motion detection. Rennes, France, 17-21 Sep. 1979). The next step comprises computing, for each cluster, its size (in voxels) and the average value of voxels belonging to the cluster in the differential image. If multiple clusters have the same size, values for them are averaged.

Another useful feature in practice, is the correlation between color values of matching pixels in the first and second registered images. This correlation is most conveniently represented in the form of a two-dimensional histogram. Here, two-dimensional histogram H for images $I_1$, $I_2$ means a two-dimensional array, cell $(c_1, c_2)$ which stores the number of voxels having color $c_1$ in the first image, while the matching pixel of the second image has color $c_2$:

$$H_{I_1,I_2}(c_1, c_2) = \sum_{B \in \Omega_2} ((I_1(T(B)) == c_1) \&\& (I_2(B) == c_2))$$

where: $I_1$ is the tabular discrete function describing the first three-dimensional image;
$I_2$ is the tabular discrete function describing the second three-dimensional image;
$\Sigma B \in \Omega_2 (\dots)$ is the arithmetic sum over all points of the image;

$H_{I_1,I_2}(c_1, c_2)$ is the two-dimensional histogram;
$c_1$ is the color value belonging to the color space of image $I_1$;
$c_2$ is the color value belonging to the color space of image $I_2$;
"==" is the comparison operator equal to 1 if both operands are equal and 0 if the operands are not equal;
"&&" is the operator "and" equal to 1 if both operands are 1 and 0 if at least one operand is not equal to 1.

Figure 5:
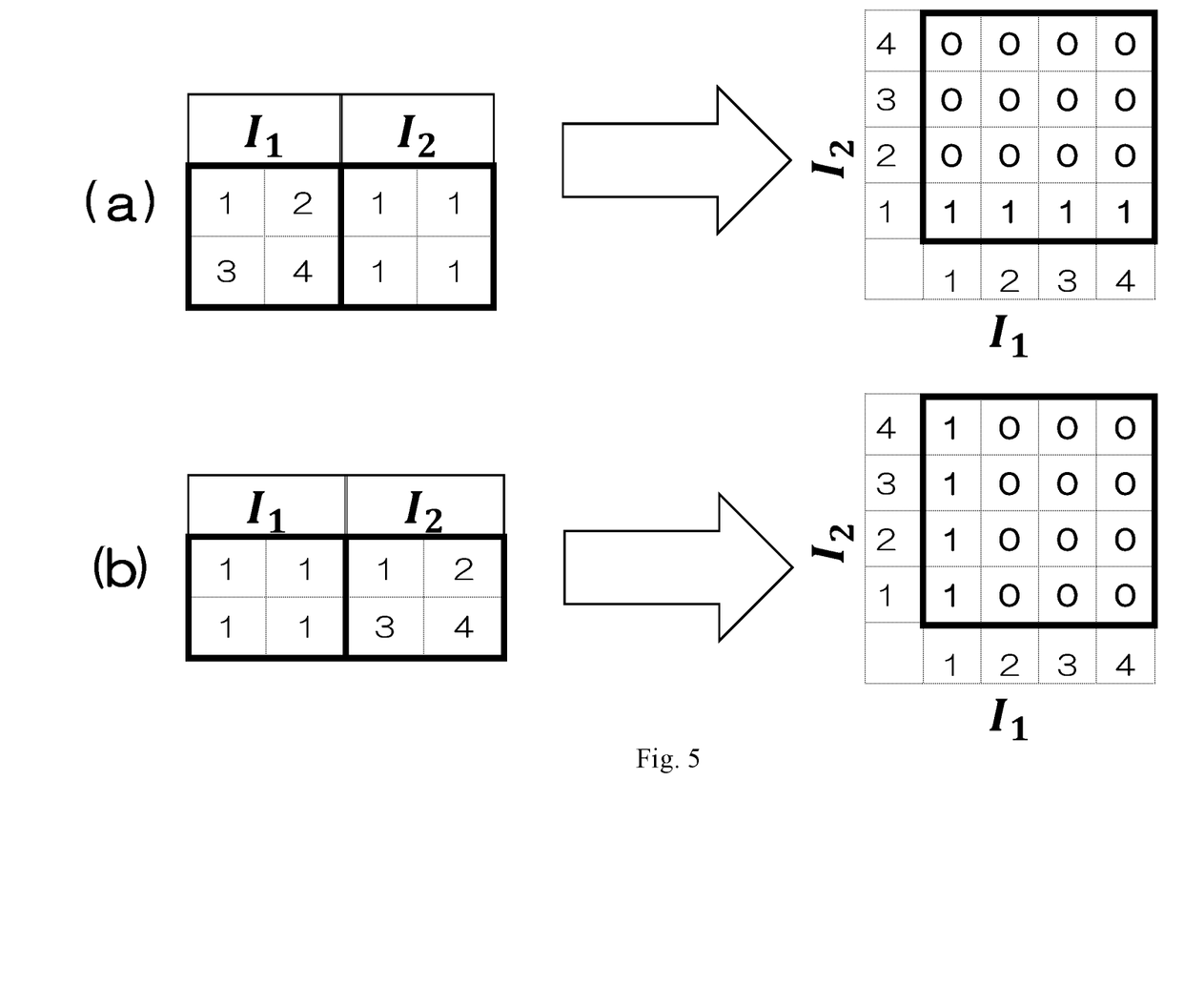
FIG. 5 is an example of computing a two-dimensional histogram.

FIG. 5a depicts an example of computing a two-dimensional histogram from a pair of images having a size of 2×2 pixels. In the first image, all four pixels have different values from 1 to 4, while in the second one all values are equal to 1. Thus, the following pairs of corresponding pixel values are present in the analyzed image pair: (1;1), (2;1), (3;1) and (4;1). Each pair is encountered only once, so the two-dimensional histogram is equal to 1 at points (1;1), (2;1), (3;1), (4;1) and is equal to 0 at the other points. Symmetrical situation is observed in the case shown in FIG. 5b.

To compute the two-dimensional histogram the images are pre-registered. It is clear that in the case of analysis of two identical images, values of corresponding pixels will be equal. This will lead to the fact that the two-dimensional histogram will be 0 everywhere except the diagonal elements. The array of only diagonal elements in this case will be equivalent to the standard one-dimensional histogram of the image.

Figure 6:
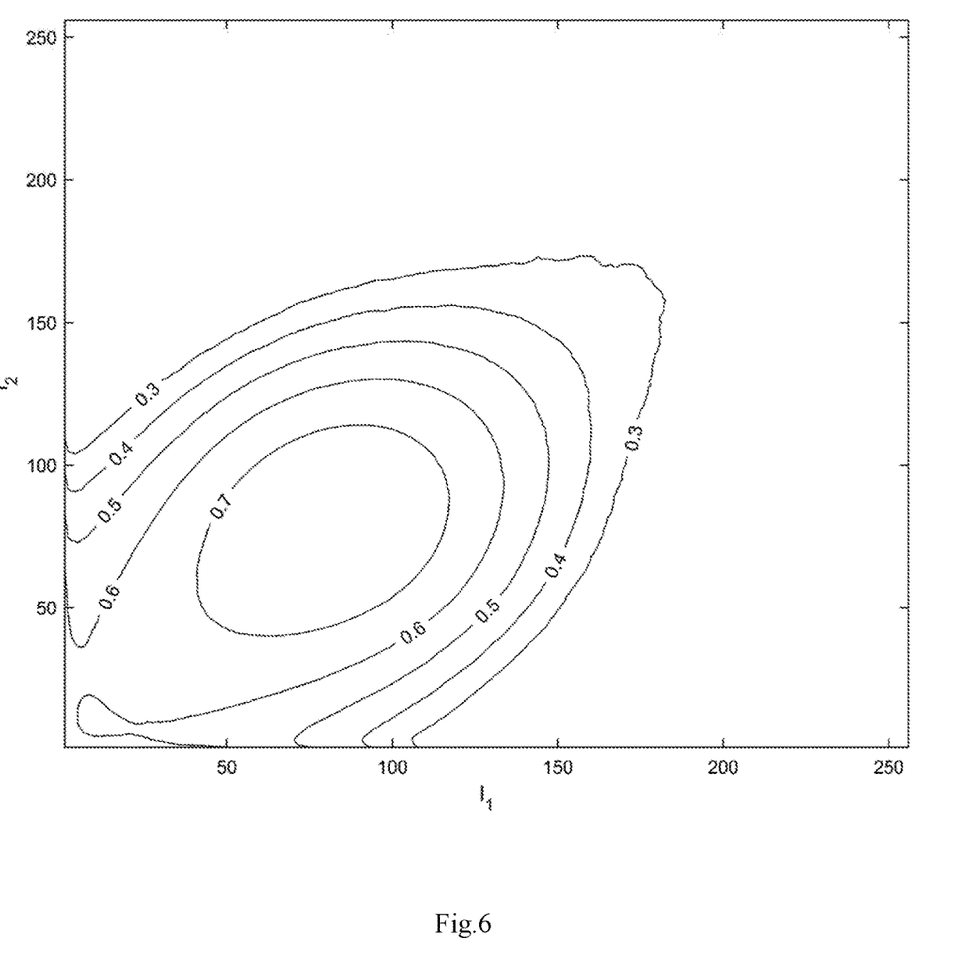
FIGS. 6, 7 and 8 show examples of two-dimensional histograms for various pairs of images.

In analysis of two correctly registered real images of the same sample free of any structural changes, the histogram will not be diagonal because of the experimental error. Nevertheless, values in the corresponding pixels will differ only within the experimental error. For this reason, the two-dimensional histogram will be symmetrical about its diagonal and have own local maxima thereon. An example of a two-dimensional histogram of a real pair of correctly registered three-dimensional images is shown in FIG. 6.

Figure 7:
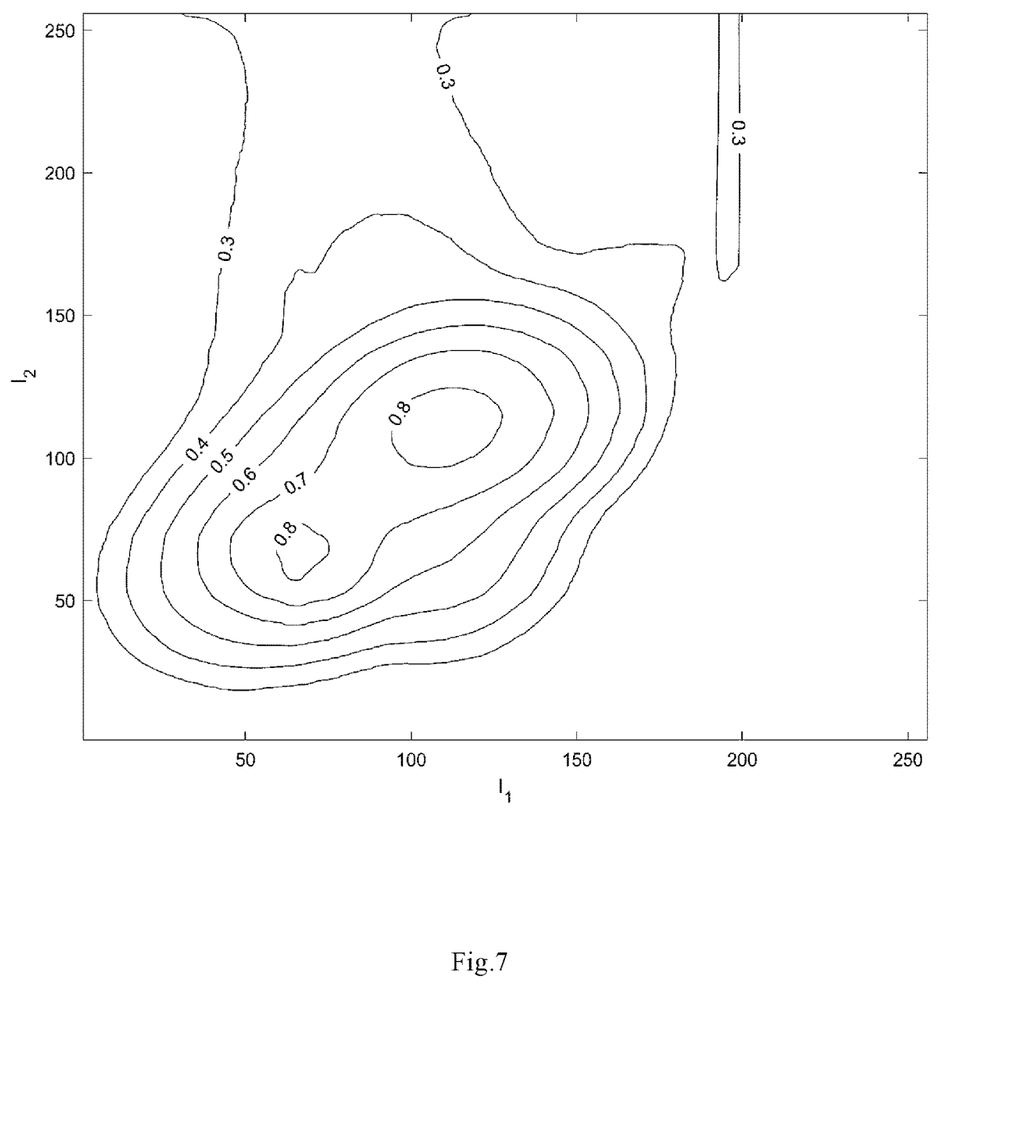
Figure 8:
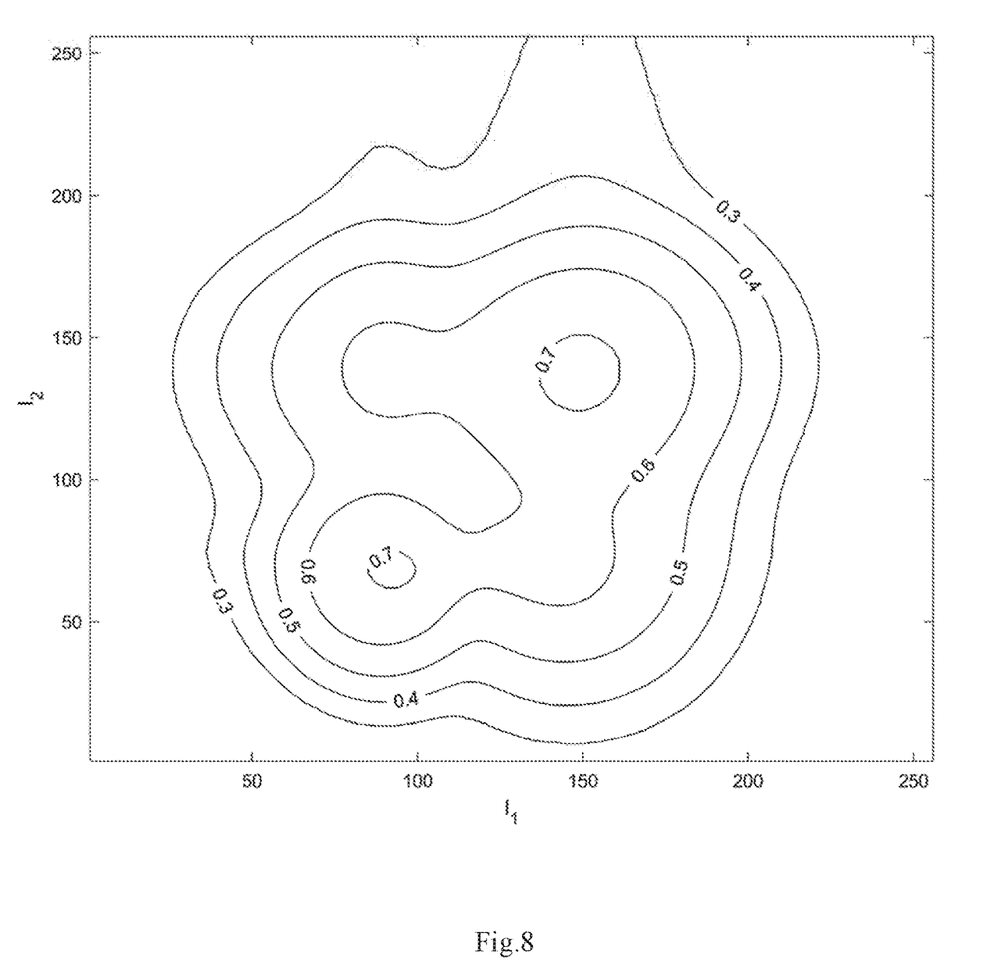

Finally, if any changes occurred in the sample in the period between the first and second scans, non-zero areas shifted away from the diagonal of equal values will appear on the two-dimensional histogram (FIG. 7). Cases of internal changes in the sample should be distinguished from cases of incorrect registration of images (or complete lack thereof). FIG. 8 shows an example of a two-dimensional histogram with incorrect registration of two images. It is apparent that the resulting distribution is more or less symmetrical with respect to the diagonal of equal values, but some maxima are located away from it, in contrast to FIG. 6.

Therefore, a two-dimensional histogram can be computed from the registered images both to evaluate the type and nature of changes occurring in the rock structure, and to check the image registration quality.

Visual analysis of two-dimensional histograms is useful in study of changes in rock, which occurred, for example, as a result of chemical reactions, where individual substances, including mineral skeleton, may partially dissolve, change the chemical composition, and change the size. In terms of X-ray tomography all these changes lead to a variation in the X-ray absorption coefficient, and hence can be detected in a two-dimensional histogram.

In many cases, e.g. investigation of processes associated with dissolution of a mineral, it may be useful to introduce a characteristic, which describes a depth of damage. Respective computations can be accomplished as follows. Original image is clustered as described above; "distance transformation" is computed (this transformation correlates, for each voxel, the distance from it to the nearest voxel corresponding to "void space", and a two-dimensional histogram is computed for the differential image and transformation of the distance.

Furthermore, the obtained result can be simplified to a usual, one-dimensional histogram by computing the average value of the differential image for each value of the distance transformation.

A separately mentioned case is where each voxel of the image can be associated with a specific type of substance. For example, in some cases the mineral type may be directly determined from the value of an X-ray absorption coefficient at a given point. It is then possible to evaluate the number and nature of changes for each type of substance independently.

Further examples describe applications of a method for evaluating the integrity of a sample of rock.

A sample of rock (sandstone) was scanned by X-ray microtomograph twice: in the "initial state" and after a year of storage at specific room conditions. Then, the obtained images were registered as described above. FIG. 9a shows a two-dimensional slice of a micro-tomogram image of sandstone in the initial state, and FIG. 9b shows the same after storage (image is registered with the image shown in FIG. 9a). FIG. 9c shows differential image D of the first and second images, with brightness increased by 10 times ($D=10|I_1\ I_2|$). Bright points correspond to changed areas. Dark areas are free of changes. From the figures it is apparent that differences between the first and second images are substantially reduced to an uncorrelated noise, which allows a conclusion that no significant changes occur in the pore space and/or structure of the substance during storage.

Another example describes application of the method for selecting least destructive methods of freezing rock samples.

In the process of freezing and subsequent thawing, formation of ice from water in the pore space of the sample can lead to a variety of damages. Selection of a least damaging method for each type of rock is the important part of the process of storage and transportation of samples, significantly affecting the accuracy of subsequent laboratory tests. Several freezing types were studied (fast—by placing a sample in liquid nitrogen, slow—with gradually decreasing the temperature, and others). Each type of freezing was tested on several types of rock. After registration of images, the expert examined differential images of rock and selected the least damaging method for each type of rock.

Figure 9:
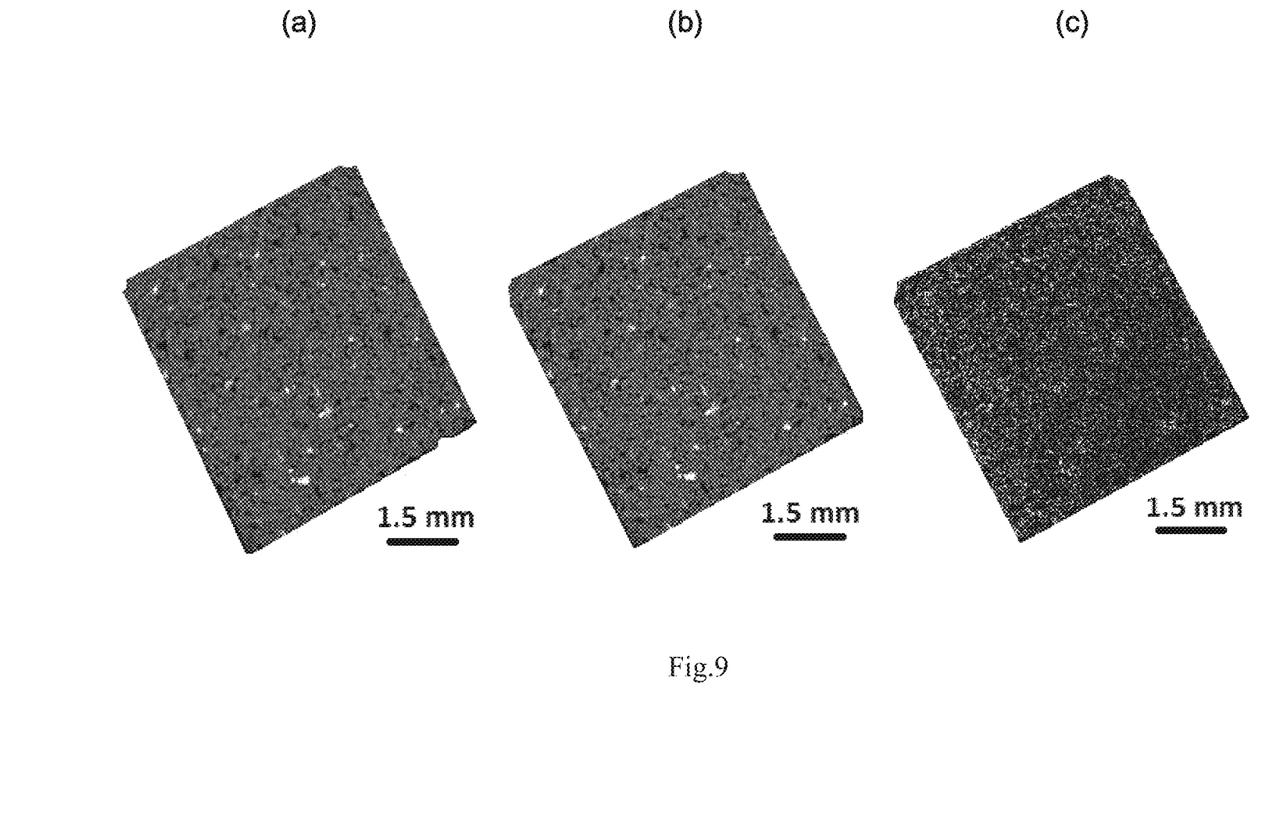
FIG. 9a is a two-dimensional slice of a micro-photographic image of sandstone in initial state.
FIG. 9b is a two-dimensional slice of a micro-photographic image of sandstone after storage (image is superposed with the image shown in FIG. 9a)
FIG. 9c is their differential image.
Figure 10:
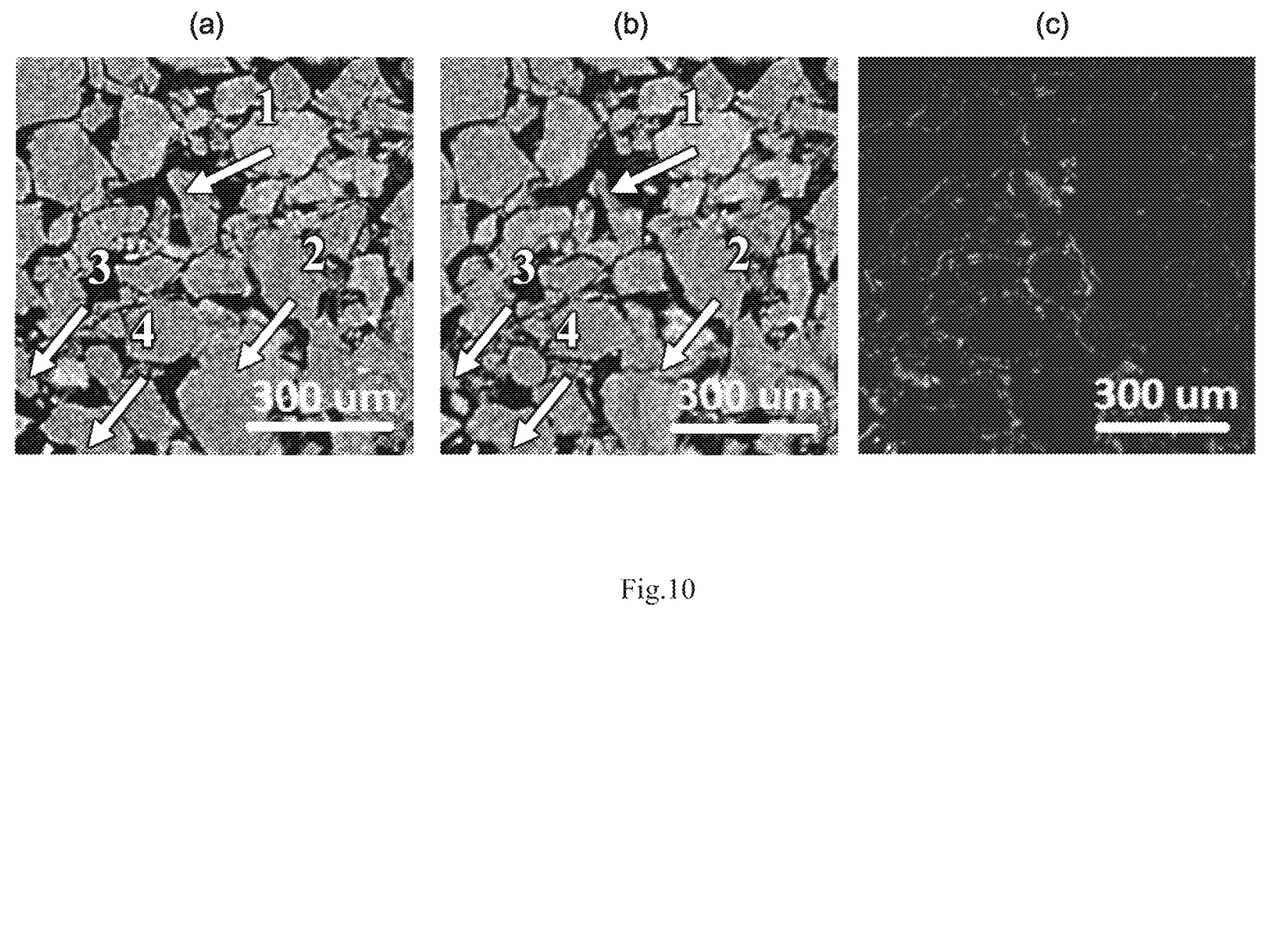
FIG. 10a is an image of clay sandstone in initial state.
FIG. 10b is an image of clay sandstone after freezing.
FIG. 10c is a differential image.

FIG. 9a shows an image of clay sandstone in the initial state; FIG. 9b shows an image of clay sandstone after freezing, and FIG. 9c shows a differential image. Specific types of changes are marked in FIG. 9: 1—disintegration of grain; 2—destruction of grain; 3—migration of particles; 4-change in the nature of contact between grains. The average distance traveled by individual particles can be estimated as 2-3 their linear sizes. Appearance of bright boundaries in the differential image is associated with a disturbance of grain boundaries of the substance in the process of freezing/thawing (FIG. 9c).

The invention claimed is:

1. A method for evaluating structural changes in a sample of a material, resulting from a treatment of the sample, the method comprising:
    scanning at least one sample of the material and obtaining a first image of the sample;
    performing a treatment of each scanned sample;
    scanning each sample after the treatment and obtaining a second image of each sample;

for each sample, performing an initial registration of the first and the second images in a reduced resolution and selecting areas of correspondence of the first and the second images;

for each sample, from the selected area of correspondence of the first and the second images selecting by the same coordinates pairs of patches of the first and the second images;

for each sample, registering each selected pair of the patches of the first and the second images in a full spatial resolution and determining similarity transformation parameters for each selected pair;

for each sample, registering the first and the second images in a full spatial resolution by estimating similarity transformation parameters for the entire sample using the determined similarity transformation parameters for each selected pair, and analyzing the registered images and evaluating changes in each sample caused by the performed treatment.

2. The method of claim 1, wherein the treatment of the sample is a thermal treatment.

3. The method of claim 1, wherein the treatment of the sample is a chemical treatment.

4. The method of claim 3, wherein the chemical treatment is extraction or cleaning of a pore space of the sample.

5. The method of claim 1, wherein the treatment of the sample is a mechanical treatment.

6. The method of claim 1, wherein the treatment of the sample is a transportation of the sample.

7. The method of claim 1, wherein the treatment of the sample is a storage of the sample.

8. The method of claim 1, wherein the methods of scanning before and after the treatment are different.

9. The method of claim 1, wherein each obtained image of the sample is a one-dimensional image.

10. The method of claim 1, wherein each obtained image of the sample is a two-dimensional image.

11. The method of claim 1, wherein each obtained image of the sample is a three-dimensional image.

12. The method of claim 1, wherein the images obtained before and after the treatment have different size.

13. The method of claim 1, wherein at least one of the obtained images of the sample are pre-processed to remove distortions.

14. The method of claim 1, comprising constructing a differential image from the registered images.

15. The method of claim 1, further comprising applying different types of treatments on the samples and additionally determining a treatment producing changes of a predetermined type and value.

16. The method of claim 1, comprising repeatedly applying the treatment of one type on the samples, each treatment causing changes in the sample structure.

17. The method of claim 1, wherein each point of the obtained images comprises a set of values that characterize different physical properties of the sample.

18. The method of claim 17, wherein the set of values in each point of the image is a spectrum of absorption or emission of electromagnetic radiation in a range of wavelengths or energies.

19. The method of claim 1, wherein the registration procedure uses similarity transformations with further deformation, which allows determining a deformation field in the sample.

* * * * *